United States Patent [19]
Inagaki et al.

[11] Patent Number: 5,136,420
[45] Date of Patent: Aug. 4, 1992

[54] OPTICAL FIBER AMPLIFIER

[75] Inventors: Shinya Inagaki; Masayoshi Shigihara; Sakae Yoshizawa, all of Tokyo; Kazuya Sasaki, Mitaka; Keiko Takeda, Yokohama, all of Japan

[73] Assignee: Fujitsu Limited, Kawasaki, Japan

[21] Appl. No.: 541,822

[22] Filed: Jun. 21, 1990

[30] Foreign Application Priority Data

Jun. 23, 1989 [JP] Japan .................. 1-159736
Jul. 17, 1989 [JP] Japan .................. 1-182629

[51] Int. Cl.⁵ .................. H01S 3/00; H01S 3/091; G02B 6/26
[52] U.S. Cl. .................. 359/341; 359/345; 372/6
[58] Field of Search .................. 330/4.3; 350/96.13, 350/96.15, 96.21; 455/610, 611; 359/341, 345; 372/6

[56] References Cited

U.S. PATENT DOCUMENTS

| | | | |
|---|---|---|---|
| 4,132,955 | 1/1979 | Hughes | 330/4.3 |
| 4,225,826 | 9/1980 | Lewis et al. | 330/4.3 |
| 4,637,025 | 1/1987 | Snitzer et al. | 350/96.15 |
| 4,712,075 | 12/1987 | Snitzer | 330/4.3 |
| 4,778,238 | 10/1988 | Hicks | 350/96.15 |
| 4,782,491 | 11/1988 | Snitzer | 372/6 |
| 4,794,598 | 12/1988 | Desurvire et al. | 350/96.15 |
| 4,906,949 | 3/1990 | Pocholle et al. | 350/96.13 |
| 4,938,556 | 7/1990 | Digonnet et al. | 330/4.3 |
| 5,048,026 | 9/1991 | Shaw et al. | 372/6 |

FOREIGN PATENT DOCUMENTS

0224070 6/1987 European Pat. Off.
0426221A1 5/1991 European Pat. Off.
2175766 12/1986 United Kingdom .................. 330/4.3

OTHER PUBLICATIONS

Miller, C. A.; "Fibre Lasers and Amplifiers for Telecommunications", Oct. 28, 1987 Mtg in Va. on Tunable Solid State Lasers; Opt. Soc. Am. pp. 189-198.
Electronics Letters, vol. 24, No. 10, May 12, 1988, "Al-1-Fibre, Diode Pumped Recirculating-Ring Delay Line", P. R. Morkel, pp. 608-609, Stevenage, Great Britain.

Primary Examiner—Nelson Moskowitz
Attorney, Agent, or Firm—Staas & Halsey

[57] ABSTRACT

An optical fiber amplifier is disclosed wherein pumping light and signal light are introduced into an optical fiber doped with a rare-earth element to directly amplify the signal light. The optical fiber amplifier of the invention comprises means constituted from a reflecting film, a fiber loop or the like for causing pumping light to pass by a plurality of times in the doped fiber. Due to the provision of the reflective film or the fiber loop, pumping light can be utilized efficiently, and the amplification factor of the optical fiber amplifier is improved.

7 Claims, 11 Drawing Sheets

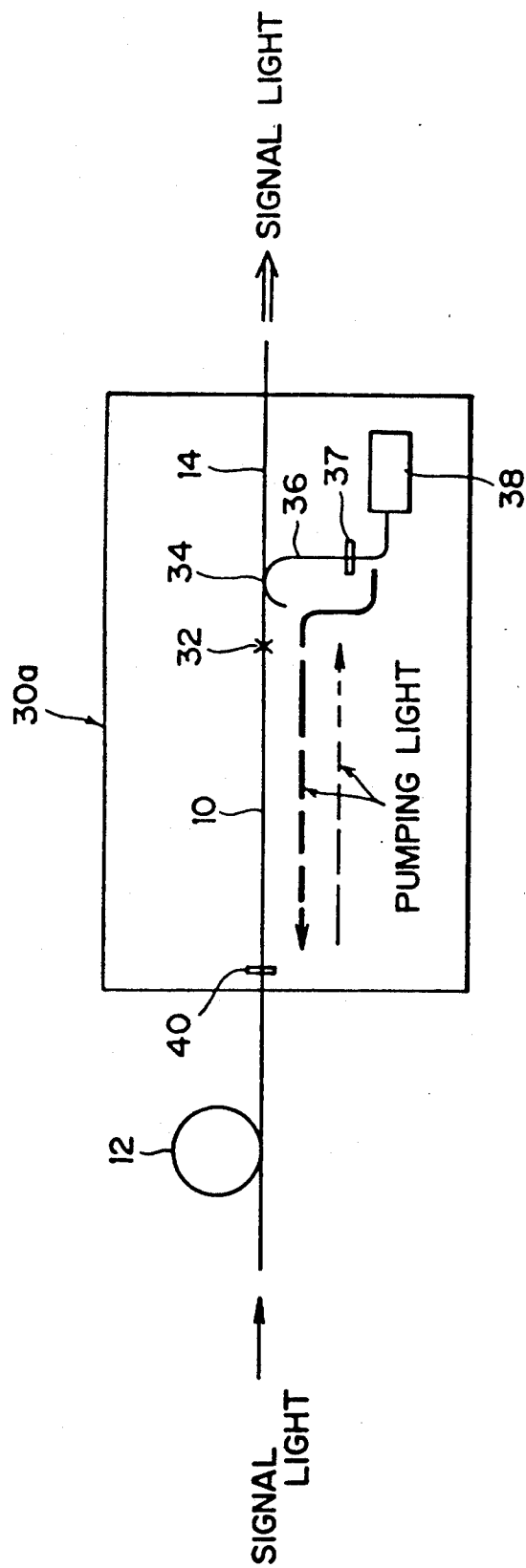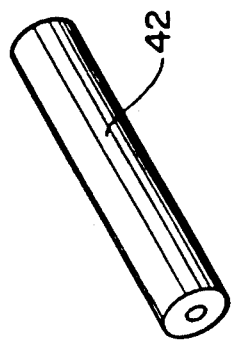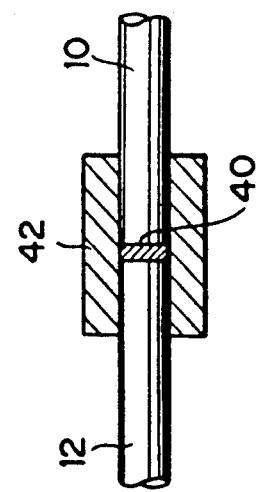

OPTICAL FIBER AMPLIFIER

BACKGROUND OF THE INVENTION

This invention relates to an optical fiber amplifier wherein signal light and pumping light are introduced into a rare-earth element doped fiber doped with a rare-earth element to directly amplify the signal light.

In an optical fiber communication system which is in practical use at present, repeaters are interposed at predetermined intervals in order to compensate for attenuation of a light signal which may be caused from a loss of an optical fiber. At each repeater, a light signal is converted into an electric signal by means of a photodiode and then the electric signal is amplified by an electronic amplifier and then converted again into a light signal by means of a semiconductor laser or the like, whereafter the light signal thus obtained is forwarded again into the optical fiber transmission line. If such light signal can be directly amplified as it is with a low noise, then the optical repeaters can be reduced in size and economized.

Thus, researches for optical amplifiers which can directly amplify a light signal are being proceeded extensively, and optical amplifiers which are objects of such researches are roughly classified into three types including (a) optical amplifiers wherein pumping light is combined with an optical fiber which is doped with a rare-earth element (Er, Nb, Yb or the like), (b) optical amplifiers which include a semiconductor laser doped with a rare-earth element, and (c) induction Raman amplifiers and induction Brillouin amplifiers which make use of a non-linear effect in an optical fiber.

Among those optical amplifiers, the first optical amplifiers of (a) wherein pumping light is combined with a rare-earth element doped fiber (hereinafter referred to simply as doped fiber) have superior features that they have no polarization dependency, that noises are low that the coupling loss of a transmission line is low. Thus, it is expected that the transmission repeater distance in an optical fiber transmission system can be increased remarkably and a light signal can be distributed to a large number of stations.

A principle of optical amplification in a doped fiber is illustrated in FIG. 1. Referring to FIG. 1, an optical fiber 2 is constituted from a core 4 and a clad 6, and erbium (Er) is doped in the core 4. If pumping light is introduced into such erbium doped fiber 2, then erbium atoms are excited to a high energy level. If signal light comes at the erbium atoms in the optical fiber 2 excited to a high energy level in this manner, the erbium atoms are changed into a ground state, whereupon stimulated emission of radiation of light occurs. Consequently, the power of the signal light is increased gradually along the optical fiber so that amplification of the signal light is effected.

General construction of an exemplary one of conventional optical fiber amplifiers which employ such principle is illustrated in FIG. 2. Referring to FIG. 2, the optical fiber amplifier is generally denoted at 8 and includes an optical fiber 10 doped with erbium, an incidence side optical fiber 12, and an emergence side optical fiber 14. The incidence side optical fiber 12 and the doped fiber 10 are optically coupled to each other using a pair of lenses 16 while the doped fiber 10 and the emergence side optical fiber 14 are also optically coupled to each other using another pair of lenses 16.

The optical fiber amplifier 8 further includes a pumping light source 18 such as a laser diode which emits pumping light of a wavelength of, for example, 1.48 μm. Pumping light emitted from the pumping light source 18 is coupled to signal light from the incidence side optical fiber 12 by means of an optical coupler 22 by way of a lens 20. When the optical power of the pumping light is sufficiently high, erbium atoms in the doped fiber 10 are put into an excited state, and if signal light is introduced to the erbium atoms, then light is stimulated to emit from the erbium atoms. Consequently, the optical power of the signal light is increased gradually along the doped fiber 10, that is, the signal light is amplified, and the thus amplified signal light is introduced into the emergence side optical fiber 14.

In order to achieve sufficient optical amplification, the pumping light source 18 is required to have a high power of such as, for example, several hundreds mW. However, in case it is difficult to obtain such high power with the single pumping light source 18, a pair of pumping light sources 18 and 24 may be used as shown in FIG. 3. In particular, pumping light from the pumping light source 24 is optically coupled to pumping light from the pumping light source 18 by means of an optical coupler 28 by way of lens 26. The pumping light coupled in this manner is then coupled to signal light from the incidence side optical fiber 12 by means of another optical coupler 22 and introduced into the doped optical fiber 10.

Where optical amplification is effected with an optical fiber doped with a rare-earth element such as erbium, conventionally a pumping light source of a high power of, for example, several hundreds mW or so is required as described above, and in order to make up for an insufficient power, normally a plurality of pumping light sources are used to introduce pumping light therefrom into the doped fiber. Consequently, in order to assure a high power of a pumping light source such as a laser diode, high driving current is required, which sometimes deteriorates the reliability of a device. Further, since a plurality of pumping light sources are used, an introducing mechanism for pumping light is complicated, which deteriorates the economy of the system. In addition, in case the output power of a pumping light source is low, the length of a doped fiber must be increased, for example, to several tens meters or so, and accordingly, there is a problem that miniaturization of the optical amplifier cannot be achieved.

SUMMARY OF THE INVENTION

Accordingly, it is an object of the present invention to provide an optical fiber amplifier which solves such problems of the prior art as described above and makes effective use of pumping light.

In accordance with an aspect of the present invention, there is provided an optical fiber amplifier adapted to directly amplify signal light, which comprises a rare-earth element doped fiber doped with a rare-earth element; means for introducing signal light into the doped fiber; a light source for emitting pumping light; means for introducing the pumping light into the doped fiber; and means for causing the pumping light from the light source to pass a plurality of times in the doped fiber.

In accordance with another aspect of the present invention, there is provided an optical fiber amplifier adapted to directly amplify signal light, which comprises a signal light transmission line including a rare-earth element doped fiber doped with a rare-earth element; a light source for emitting pumping light; a first optical multiplexer/demultiplexer interposed in the signal light transmission line and having an end connected to the light source; and pumping light reflecting means for returning pumping light which has been introduced into the doped fiber by way of the first optical multiplexer/demultiplexer and has passed through part or all of the doped fiber again into the doped fiber.

In accordance with a further aspect of the present invention, there is provided an optical fiber amplifier adapted to directly amplify signal light, which comprises a signal light transmission line including a rare-earth element doped fiber doped with a rare-earth element; a light source for emitting pumping light; a first optical multiplexer/demultiplexer interposed in the signal light transmission line; a second optical multiplexer/demultiplexer interposed in the signal light transmission line for cooperating with the first optical multiplexer/demultiplexer to sandwich the doped fiber therebetween; a connecting fiber for connecting the first and second optical multiplexer/demultiplexers to each other to form a fiber loop including the doped fiber; and means for connecting the light source to the fiber loop.

According to the present invention, since efficient use can be made of pumping light, the amplification efficiency of the optical fiber amplifier is improved. Such improvement in amplification efficiency makes it possible to reduce the output power of the pumping light source and results in improvement in economy and reliability of the optical fiber amplifier. Meanwhile, if the output power of the pumping light source is the same, then the improvement in amplification efficiency makes it possible to reduce the length of the doped fiber to be used, and accordingly, miniaturization of the optical fiber amplifier can be achieved.

The above and other objects, features and advantages of the present invention and the manner of realizing them will become more apparent, and the invention itself will best be understood, from a study of the following description and appended claims, with reference had to the attached drawings some preferred embodiments of the invention.

BRIEF DESCRIPTION OF THE DRAWINGS

FIG. 4 is a diagrammatic view of an optical fiber amplifier showing a first preferred embodiment of the present invention;

FIG. 5 is a detailed sectional view of a reflecting film and associated parts of the optical fiber amplifier of FIG. 4;

FIG. 6 is a perspective view of a ferrule of the optical amplifier of FIG. 4;

DESCRIPTION OF THE PREFERRED EMBODIMENTS

Figure 1:
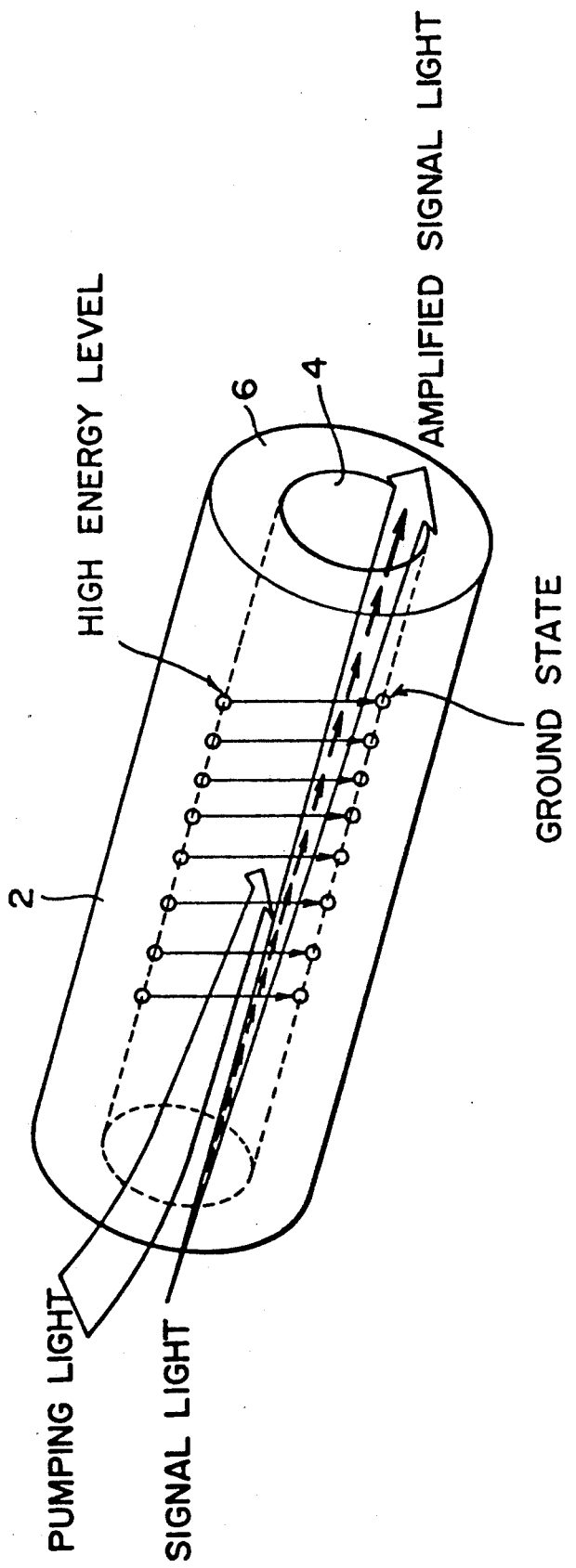
FIG. 1 is a schematic view illustrating a principle of an optical amplifier which employs a rare-earth element doped fiber.
Figure 2:
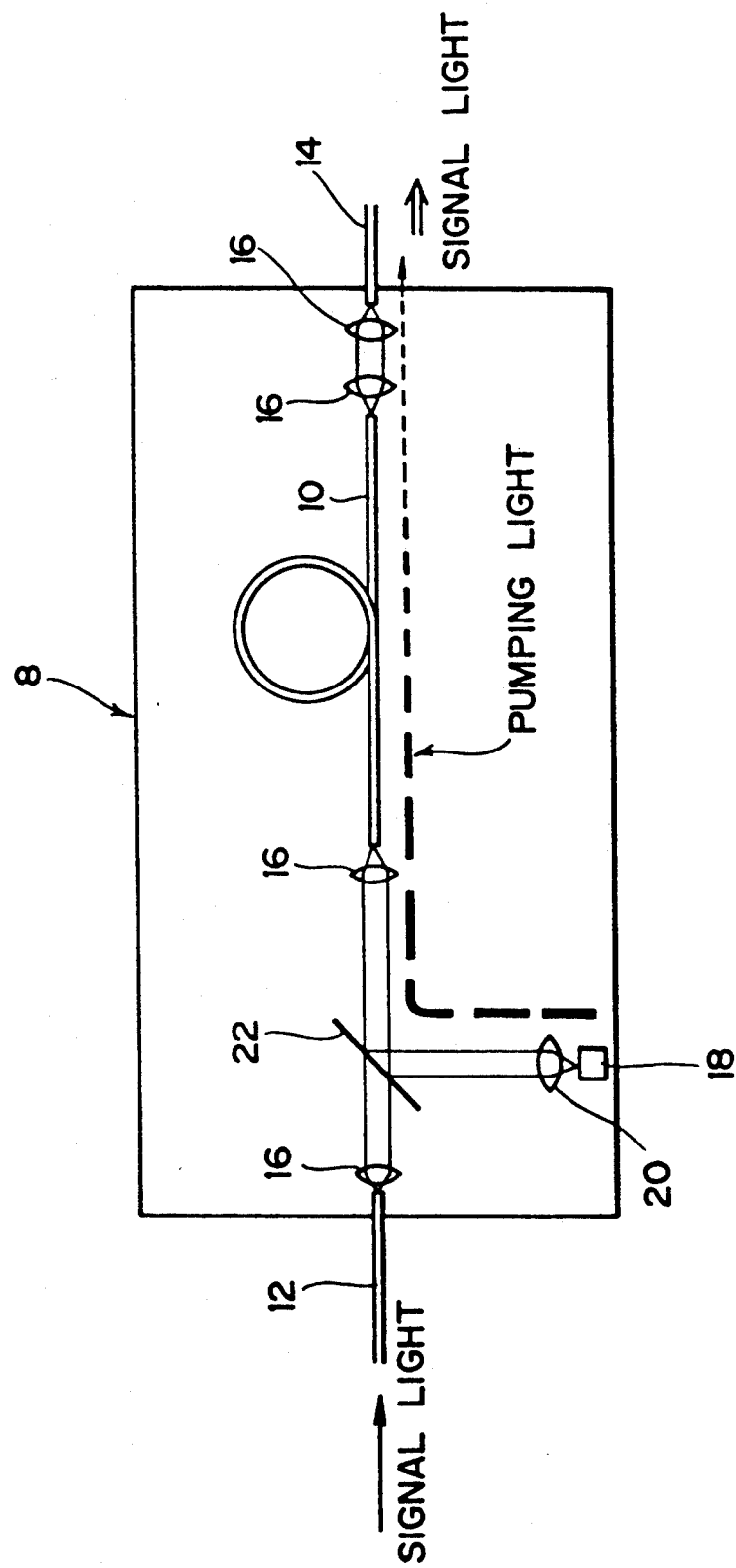
FIG. 2 is a diagrammatic view of a conventional optical fiber amplifier.
Figure 3:
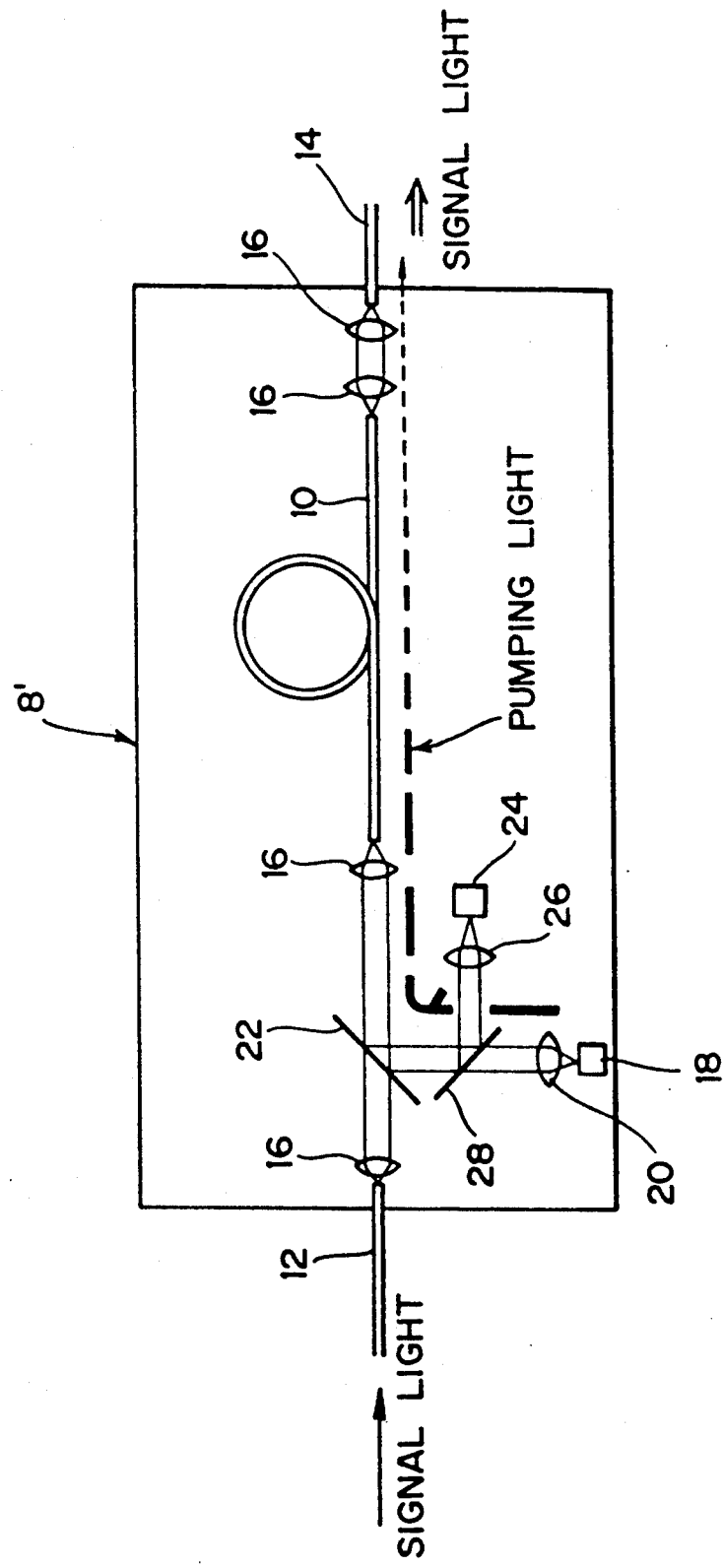
FIG. 3 is a similar view but showing another conventional optical fiber amplifier.

In the following, several embodiments of the present invention will be described in detail with reference to the drawings. In the description of the embodiments, substantially like parts or elements are denoted by like reference characters throughout the embodiments, and substantially like parts or elements to those of the conventional optical fiber amplifiers shown in FIGS. 2 and 3 are also denoted by like reference characters.

Referring first to FIG. 4, there is shown in schematic representation an optical fiber amplifier according to a first embodiment of the present invention. The optical fiber amplifier shown is generally denoted at 30a and includes a rare-earth element doped fiber 10 having a core in which a rare-earth element such as erbium is doped. The optical fiber amplifier further includes an incidence side optical fiber 12 and an emergence side optical fiber 14. The doped fiber 10 and the emergence side optical fiber 14 are connected to each other by way of a connecting portion 32 provided by fusion joining or the like. The incidence side optical fiber 12 and the doped fiber 10 are connected to each other by way of a reflecting film 40.

Connection at such reflecting film portion is constructed in such a manner as shown in an enlarged sectional view of FIG. 5. In particular, the reflecting film 40 is disposed in such a ferrule 42 as shown in FIG. 6, and the incidence side optical fiber 12 and the doped optical fiber 10 are inserted from the opposite ends into the ferrule 42 and connected to each other by way of the reflecting film 40 in such a manner as shown in FIG. 5. The inner diameter of the ferrule 42 is formed a little greater than the outer diameter of the optical fibers 10 and 12 such that, when the incidence side optical fiber 12 and the doped optical fiber 10 are inserted into the ferrule 42, the two optical fibers 10 and 12 may be secured in an accurately aligned condition with each other in and by the ferrule 42. The ferrule 42 is formed from such a material as, for example, a ceramics material. The reflecting film 40 has a characteristic that it reflects light of a wavelength of pumping light but transmits signal light of a 1.55 μm band therethrough and is formed from, for example, a dielectric multilayer film.

Referring back to FIG. 4, an optical multiplexer/demultiplexer 34 of the fusion joined fiber type is provided on the emergence side optical fiber 14, and an optical fiber 36 of the optical multiplexer/demultiplexer 34 is connected to a pumping laser diode 38. The optical fiber 36 of the optical multiplexer/demultiplexer 34 has an optical isolator 37 interposed therein for preventing reflected returning light of pumping light from being introduced into the pumping laser diode 38.

Pumping light emitted from the pumping laser diode 38 (for example, of a wavelength of 0.67 μm, 0.9 μm or 1.48 μm) is introduced by way of the optical multiplexer/demultiplexer 34 into the doped fiber 10 wherein erbium is doped in the core. Meanwhile, signal light (for example, of a wavelength of 1.55 μm) is introduced into the optical fiber amplifier 30a by way of the incidence side optical fiber 12. Since the reflecting film 40 has a characteristic that it transmits signal light of the 1.55 μm band therethrough, the signal light passes through the reflecting film 40 and is introduced into the doped fiber 10. Erbium atoms which are in an excited state due to reception of the pumping light are changed into a ground state as a result of such incidence of the signal light, whereupon light is stimulated to emit from the erbium atoms. Consequently, the optical power of the signal light is increased gradually along the doped fiber 10, or in other words, the signal light is amplified, and the thus amplified signal light is introduced into the emergence side optical fiber 14. Meanwhile, the pumping light having been transmitted in the doped fiber 10 is reflected by the reflecting film 40 and thus fed back into the doped fiber 10 so that it further makes an amplifying action.

Figure 7A:
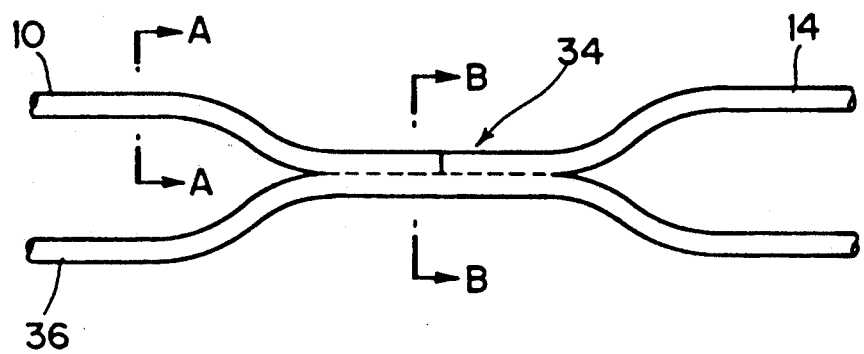
FIG. 7A is a schematic view of an optical multiplexer/demultiplexer of the fusion joined fiber type adapted for use with the optical fiber amplifier of FIG. 4.
Figure 7B:
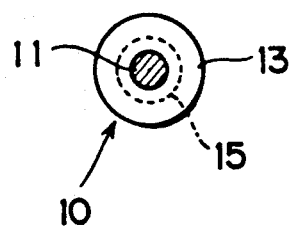
FIG. 7B is a sectional view taken along line A—A of FIG. 7A.
Figure 7C:
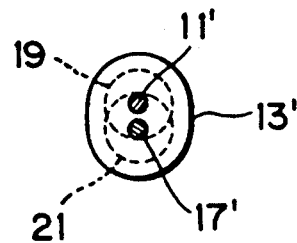
FIG. 7C is a sectional view taken along line B—B of FIG. 7A.

A construction wherein the connecting portion between the doped fiber 10 and the emergence side optical fiber 14 is formed as a common portion to the optical multiplexer/demultiplexer 34 of the fusion joined fiber type will be described subsequently with reference to FIGS. 7A to 7C. In particular, as shown in FIG. 7A, end faces of the doped fiber 10 and the emergence side optical fiber 14 are abutted and connected to each other by fusion joining. The optical fiber 36 connected to the pumping laser diode 38 is disposed in a juxtaposed relationship with the fiber obtained by such fusion joining, and then, they are heated and drawn or elongated to connect them by fusion joining. The section of the doped fiber 10 taken along line A—A of FIG. 7A includes the core 11 and the clad 13 as shown in FIG. 7B. Meanwhile, a portion of the fibers connected to each other by fusion joining by heating and drawing has such a construction that cores 11' and 17' of the doped fiber 10 and fiber and optical fiber 36 which have been made thinner by heating and drawing are disposed proximate to each other and the clads of the doped fiber 10 and optical fiber 36 are fused to form a common clad 13' having an elliptical shape as seen in FIG. 7C.

While the signal light is confined in and transmitted along the core 11, it may partly leak to the clad 13 side as indicated by a broken line in FIG. 7B. Meanwhile, where the sectional area of the core 11 is reduced as indicated at 11' in FIG. 7C while the sectional area of the core of the optical fiber 36 is reduced as indicated at 17' in FIG. 7C, the amount of the signal light which leaks to the clad 13' side is increased as indicated by broken lines 19 and 21 in FIG. 7C. As a result, the signal light and the pumping light are combined with each other. Further, where the length of the connected portion by fusion joining by heating and drawing is selected suitably, the combination efficiency or multiplexing efficiency can be increased. The sectional area of the abutted fused portion between the doped fiber 10 and the emergence side optical fiber 14 is reduced by the drawing, and if it is reduced, for example, to one half comparing with a sectional area of any other portion, then the amount of reflected light at the abutted fused portion is reduced to one half comparing with that in an alternative case wherein the sectional area is not reduced. Thus, reflection at the abutted fused portion at which reflection is small comparing with a connector is further reduced by heating and drawing.

Figure 8:
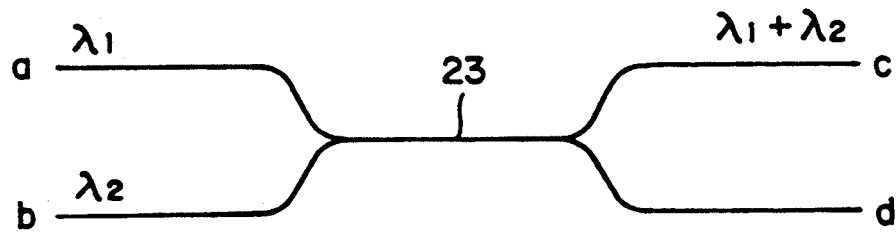
FIG. 8 is a schematic illustration of the optical multiplexer/demultiplexer of the fusion joined fiber type shown in FIG. 7A.

The optical multiplexer/demultiplexer of the fusion joined fiber type shown in FIG. 7A has such a construction wherein it has four ports a, b, and d as shown in FIG. 8. If light of a wavelength $\lambda_1$ is introduced into the optical multiplexer/demultiplexer by way of the port "a" and light of another wavelength $\lambda_2$ is introduced in by way of the port b, then they are combined with each other in the fusion joined portion 23 having a length selected in accordance with those wavelengths, and light of the wavelength $\lambda_1$ + wavelength $\lambda_2$ is forwarded from the port c. On the contrary, if light consisting of light of the wavelength $\lambda_1$ and light of the wavelength $\lambda_2$ combined with each other is introduced into the optical multiplexer/demultiplexer by way of the port c, light of the wavelength $\lambda_1$ and light of the wavelength $\lambda_2$ are separated from each other by the optical multiplexer/demultiplexer and the former is forwarded from the port "a" while the latter is forwarded from the port b.

Figure 9A:
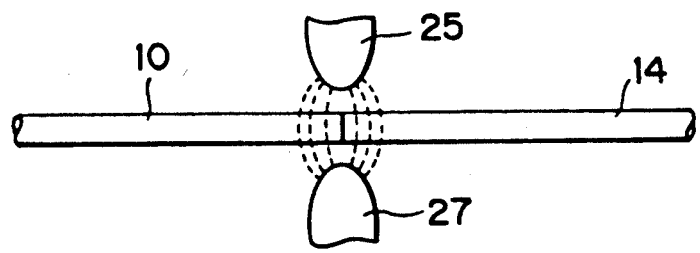
FIGS. 9A to 9D are schematic views showing different steps of a process of producing the optical multiplexer/demultiplexer of the fusion joined fiber type shown in FIG. 8.

A process of production of the optical multiplexer/demultiplexer of the fusion joined fiber type shown in FIG. 7A will be described subsequently with reference to FIGS. 9A to 9D. First, a doped fiber 10 and an emergence side optical fiber 14 are abutted with each other between a pair of electrodes 25 and 27 as shown in FIG. 9A, and a voltage is applied between the electrodes 25 and 27 to cause a discharge between them to fuse the abutted portions of the fibers 10 and 14. In this instance, positioning of the doped fiber 10 and optical fiber 14 can be performed under the observation by means of a microscope or in accordance with contents of an in indication by an enlarging indicating device which may be a display unit. Since the doped fiber 10 and the optical fiber 14 in most cases have different melting points, it is required to space the discharge position between the electrodes 25 and 27 and the abutting position of the fibers 10 and 14 by a distance of several μm to several hundreds μm from each other in accordance with a difference between the melting points.

Figure 9B:
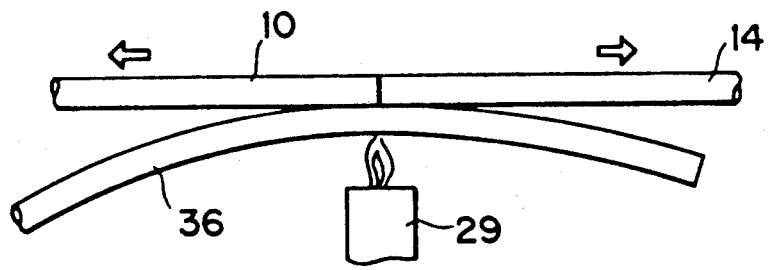
Figure 9C:
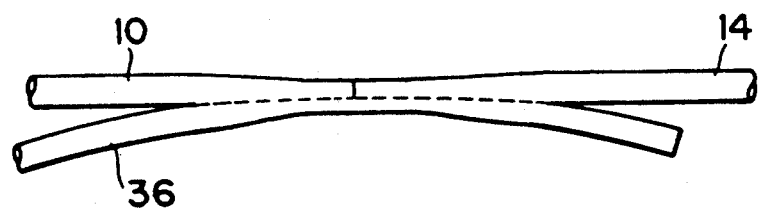
Figure 9D:
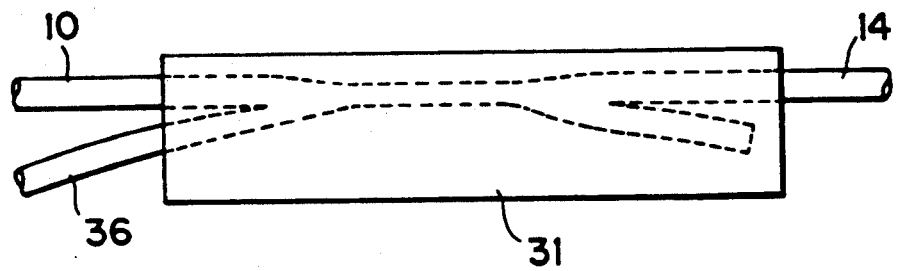

Subsequently, an optical fiber 36 is placed in a juxtaposed relationship along the thus fusion joined doped fiber 10 and the optical fiber 14 as shown in FIG. 9B, and then, they are heated by means of an oxyhydrogen burner 29 while the doped fiber 10 and optical fibers 14 and 36 are drawn in the opposite directions as indicated by arrow marks to reduce the outer diameters of them to a value from several μm to several tens μm or so and as shown in FIG. 9C fusion join the optical fiber 36 to the doped fiber 10 and the emergence side optical fiber 14 which are fusion joined to each other. After then, a reinforcing case made of a metal, plastics or ceramics material or the like is fitted on the thus fusion joined portion of the fibers 10, 14 and 36 and a synthetic resin material for the filling is poured into and solidified in the reinforcing case to form a reinforcing portion 31 as shown in FIG. 9D.

Figure 10:
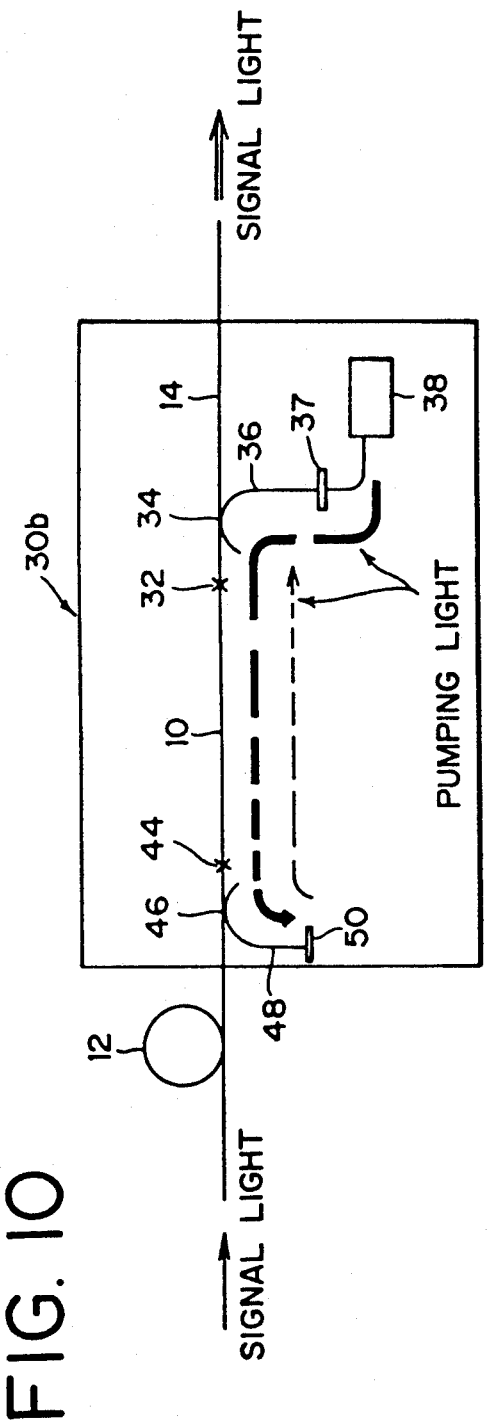
FIG. 10 is a diagrammatic view of another optical fiber amplifier showing a second preferred embodiment of the present invention.

FIG. 10 shows general construction of another optical fiber amplifier according to a second preferred embodiment of the present invention. The optical fiber amplifier is generally denoted at 30b and includes the incidence side optical fiber 12 and the doped fiber 10 connected to each other at a connecting portion 44 provided by fusion joining or the like. An optical multiplexer/demultiplexer 46 of the fusion joined fiber type similar to the optical multiplexer/demultiplexer 34 described hereinabove is provided on the incidence side optical fiber 12, and a reflecting film 50 is provided at an end face of an optical fiber 48 of the optical multiplexer/demultiplexer 46. The reflecting film 50 may be a reflecting film which only reflects light of a wavelength of pumping light or else a totally reflecting film which reflects light of all wavelengths. The other construction of the optical fiber amplifier of the present embodiment is similar to that of the optical fiber amplifier of the first embodiment shown in FIG. 4.

Thus, pumping light emitted from the pumping laser diode 38 and introduced into the doped fiber 10 by way of the optical multiplexer/demultiplexer 34 is separated from signal light by the optical multiplexer/demultiplexer 46 provided adjacent the emergent end of the incidence side optical fiber 12 and is introduced into the optical fiber 48 of the optical multiplexer/demultiplexer 46. Since the reflecting film 50 is provided at the end of the optical fiber 48, the pumping light is reflected by the reflecting film 50 and consequently is introduced back into the doped fiber 10 again by way of the optical multiplexer/demultiplexer 46. Meanwhile, the signal light is introduced into the optical fiber amplifier 30b by way of the incidence side optical fiber 12 and then passes through the optical multiplexer/demultiplexer 46, whereafter it is introduced into the doped fiber 10 in which it is amplified due to stimulated emission of radiation. After then, it is introduced into the emergence side optical fiber 14 and transmitted along the transmission line.

While the optical multiplexer/demultiplexers 34 and 46 in FIGS. 4 and 10 are disposed on the emergence side optical fiber 14 and the incidence side optical fiber 12, they may otherwise be disposed on the opposite ends of the doped optical fiber 10.

Figure 11:
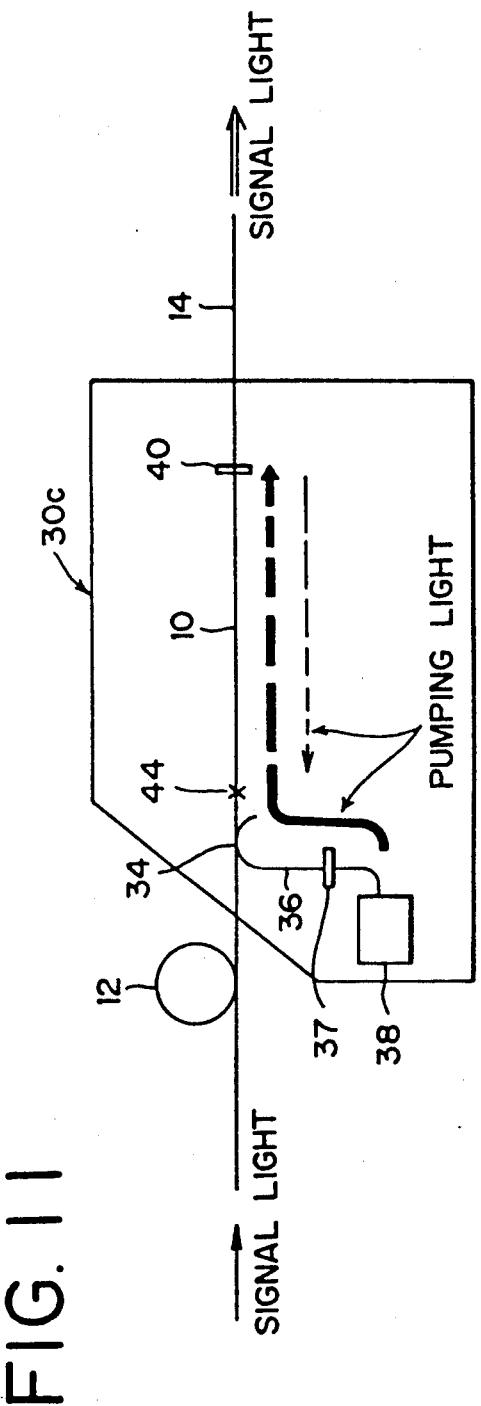
FIG. 11 is a diagrammatic view of a further optical fiber amplifier showing a third preferred embodiment of the present invention.
Figure 12:
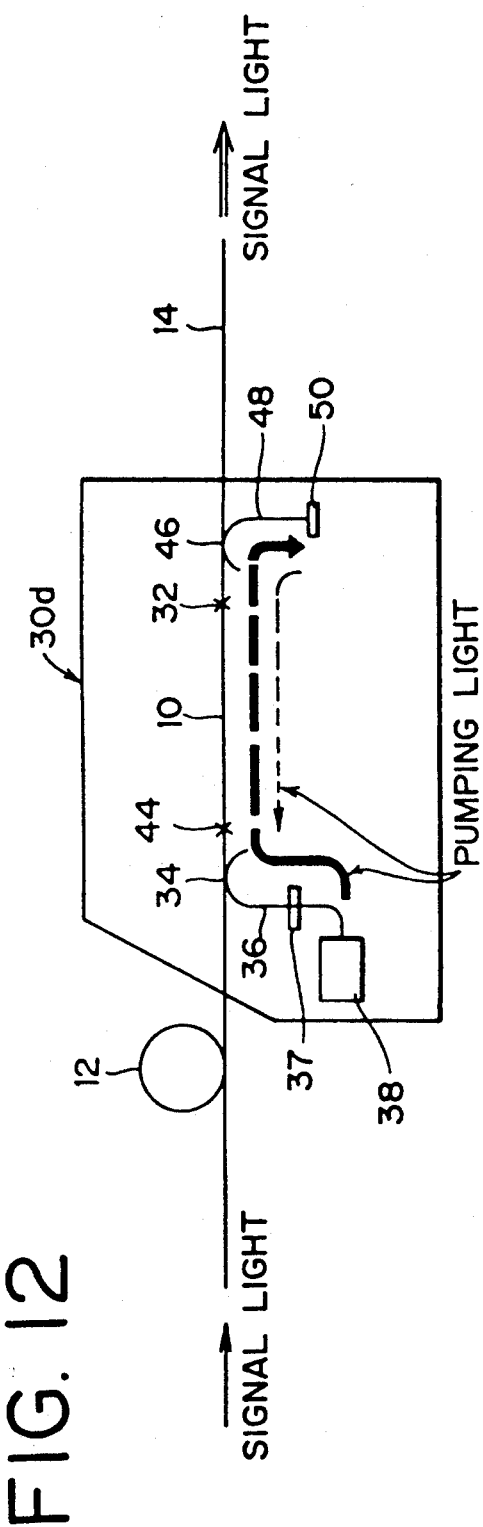
FIG. 12 is a diagrammatic view of a still further optical fiber amplifier showing a fourth preferred embodiment of the present invention.

While the optical fiber amplifiers of the embodiments shown in FIGS. 4 and 10 employ backward pumping wherein the incidence direction of pumping light is different from the incidence direction of signal light, similar effects can be achieved with an optical fiber amplifier which employs forward pumping wherein pumping light and signal light are introduced in the same direction into the optical fiber amplifier. Exemplary ones of such optical fiber amplifiers are shown in FIGS. 11 and 12.

Figure 13:
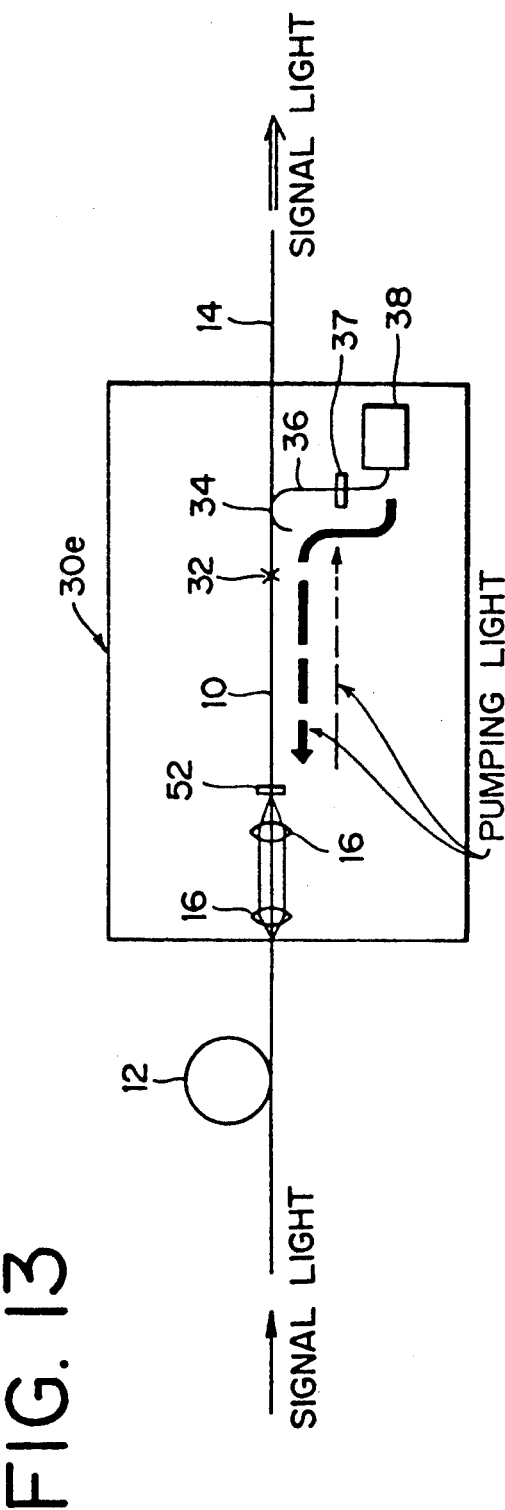
FIG. 13 is a diagrammatic view of a yet further optical fiber amplifier showing a fifth preferred embodiment of the present invention.

Meanwhile, the incidence side optical fiber 12 and the doped fiber 10 may otherwise be connected to each other by way of a pair of lenses 16 as shown in FIG. 13. The emergence side optical fiber 14 and the doped fiber 10 can be connected to each other in a similar manner.

A reflecting film 52 is formed on an end face of the doped fiber 10 by vapor deposition or the like.

Figure 14:
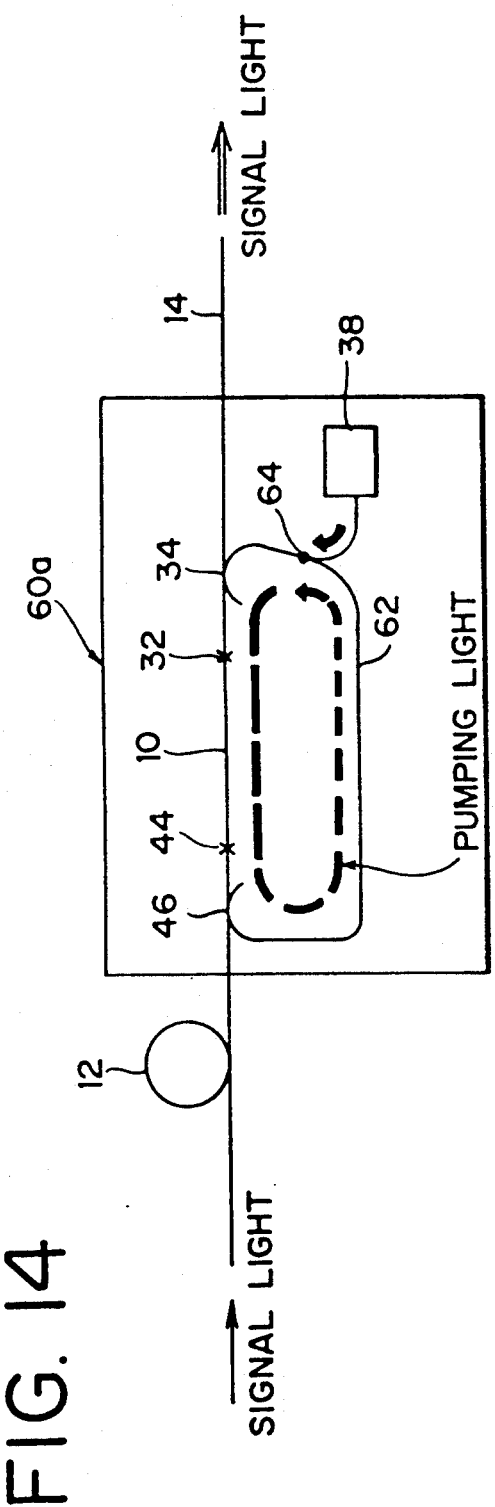
FIG. 14 is a diagrammatic view of a yet further optical fiber amplifier showing a sixth preferred embodiment of the present invention.

Referring now to FIG. 14, there is shown general construction of a further optical fiber amplifier according to a sixth preferred embodiment of the present invention. In the optical fiber amplifier denoted at 60a of the present embodiment, a pair of optical multiplexer/demultiplexers 34 and 46 of the fusion joined fiber type are connected to each other by way of a connecting optical fiber 62 to form a fiber loop. Pumping light emitted from the pumping laser diode 38 is coupled to the fiber loop by way of an optical coupler 64.

In operation, pumping light emitted from the pumping laser diode 38 passes through the optical coupler 64 and the optical multiplexer/demultiplexer 34 of the fusion joined fiber type and is introduced into the doped fiber 10. Meanwhile, signal light is introduced into the optical fiber amplifier 60a by way of the incidence side optical fiber 12 and passes through the optical multiplexer/demultiplexer 46, whereafter it is introduced into the doped fiber 10. Erbium atoms which have been excited to a high energy level by the pumping light are changed into a ground state by the reception of the signal light, whereupon light is stimulated to emit from the erbium atoms. Consequently, the optical power of the signal light is increased gradually along the optical fiber 10 (that is, the signal light is amplified), and the thus amplified signal light is introduced into the emergence side optical fiber 14.

Meanwhile, the pumping light having passed through the doped fiber 10 is separated from the signal light by the optical multiplexer/demultiplexer 46 and is then transmitted in the connecting optical fiber 62. Then, the pumping light is coupled to the pumping light from the pumping laser diode 38 by the optical coupler 64 and is introduced into the doped fiber 10 by way of the optical multiplexer/demultiplexer 34. Since the pumping light which has been used once is introduced again into the doped fiber 10 by way of the fiber loop in this manner, the amplification efficiency of the optical fiber amplifier is improved.

Figure 15:
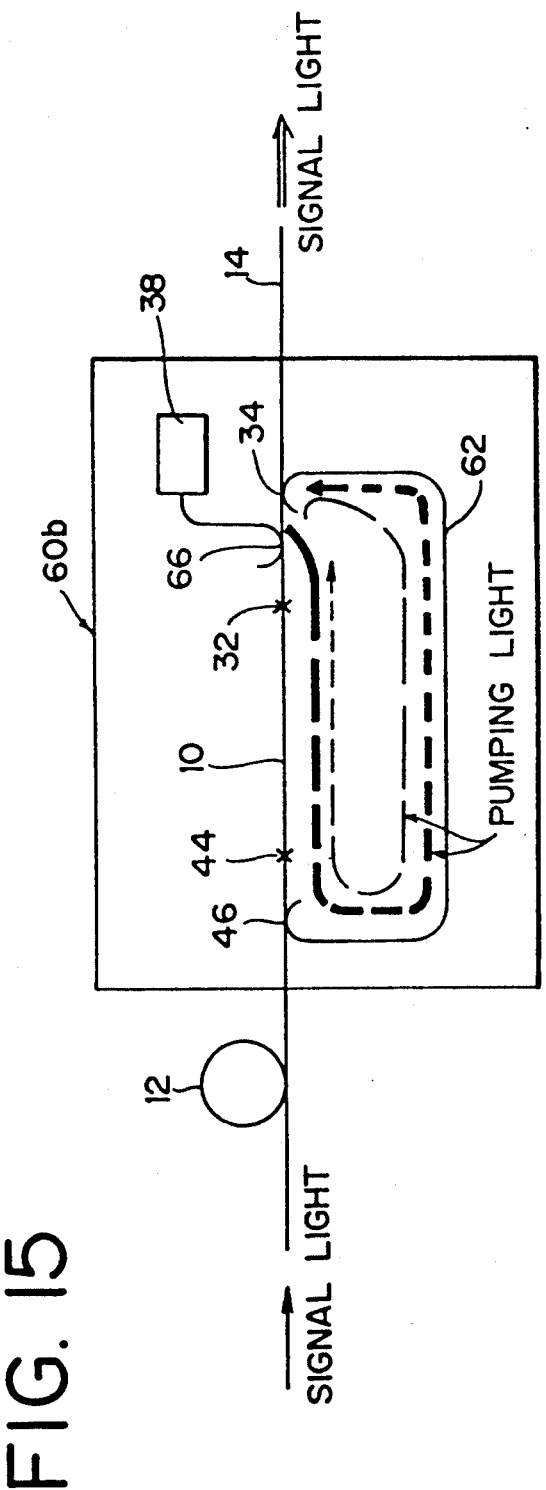
FIG. 15 is a diagrammatic view of a yet further optical fiber amplifier showing a seventh preferred embodiment of the present invention.

Referring now to FIG. 15, there is shown general construction of a still further optical fiber amplifier according to a seventh preferred embodiment of the present invention. The optical fiber amplifier denoted at 60b includes an optical multiplexer/demultiplexer 66 of the fusion joined fiber type provided on the emergence side optical fiber 14 such that pumping light from the pumping laser diode 38 may be directly introduced into the emergence side optical fiber 14 by way of the optical multiplexer/demultiplexer 66. A fiber loop for pumping light is formed from the connecting optical fiber 62 in a similar manner as in the optical fiber amplifier of the sixth embodiment shown in FIG. 14.

With the optical fiber amplifier of the construction, rearward scattered light which is produced when pumping light from the pumping laser diode 38 is introduced into the doped fiber 10 can be removed by means of the optical multiplexer/demultiplexer 34 provided on the emergence side optical fiber 14, and such rearward scattered light can be transported in the opposite direction by way of the fiber loop constituted from the connecting optical fiber 62 so that it may be introduced into the doped fiber 10 again.

Figure 16:
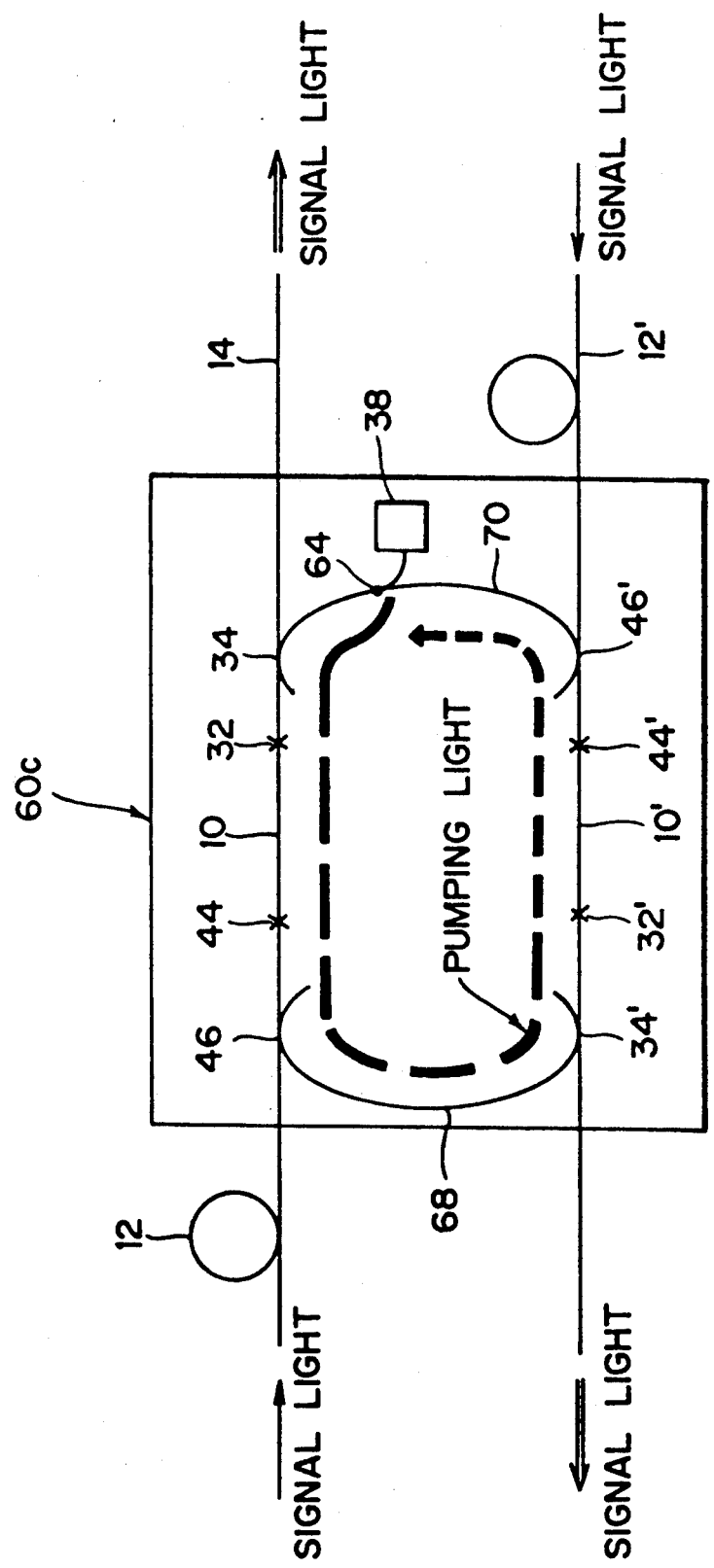
FIG. 16 is a diagrammatic view of a yet further optical fiber amplifier showing a eighth preferred embodiment of the present invention.

Referring now to FIG. 16, there is shown general construction of a yet further optical fiber amplifier according to an eighth preferred embodiment of the present invention. The optical fiber amplifier generally denoted at 60c includes an additional signal light transmission line for transmitting signal light in the opposite direction to that of the signal light transmission line which is constituted from the incidence side optical fiber 12, the doped fiber 10 and the emergence side optical fiber 14. Various components of the additional signal light transmission line are denoted by like reference characters by priming thereof. The optical multiplexer/demultiplexer 46 and another optical multiplexer/demultiplexer 34' are connected to each other by way of a first connecting optical fiber 68 while the optical multiplexer/demultiplexer 34 and another optical multiplexer/demultiplexer 46' are connected to each other by way of a second connecting optical fiber 70 to form a fiber loop. Pumping light emitted from the pumping laser diode 38 is introduced into the second connecting optical fiber 70 by way of the optical coupler 64.

In the optical fiber amplifier of the present embodiment, two optically amplifying stations individually constituted from the doped fibers 10 and 10' are provided in the fiber loop. Since pumping light is gradually attenuated while it is transmitted along the fiber loop, the length of the doped fiber 10' is preferably made greater than the length of the doped fiber 10 in order to make the two amplifying stations have substantially same amplification factors. The optical fiber amplifier of the present embodiment is advantageous in that optical amplification can be effected at a plurality of stations with the single pumping laser diode 38 by using the fiber loop.

Figure 17:
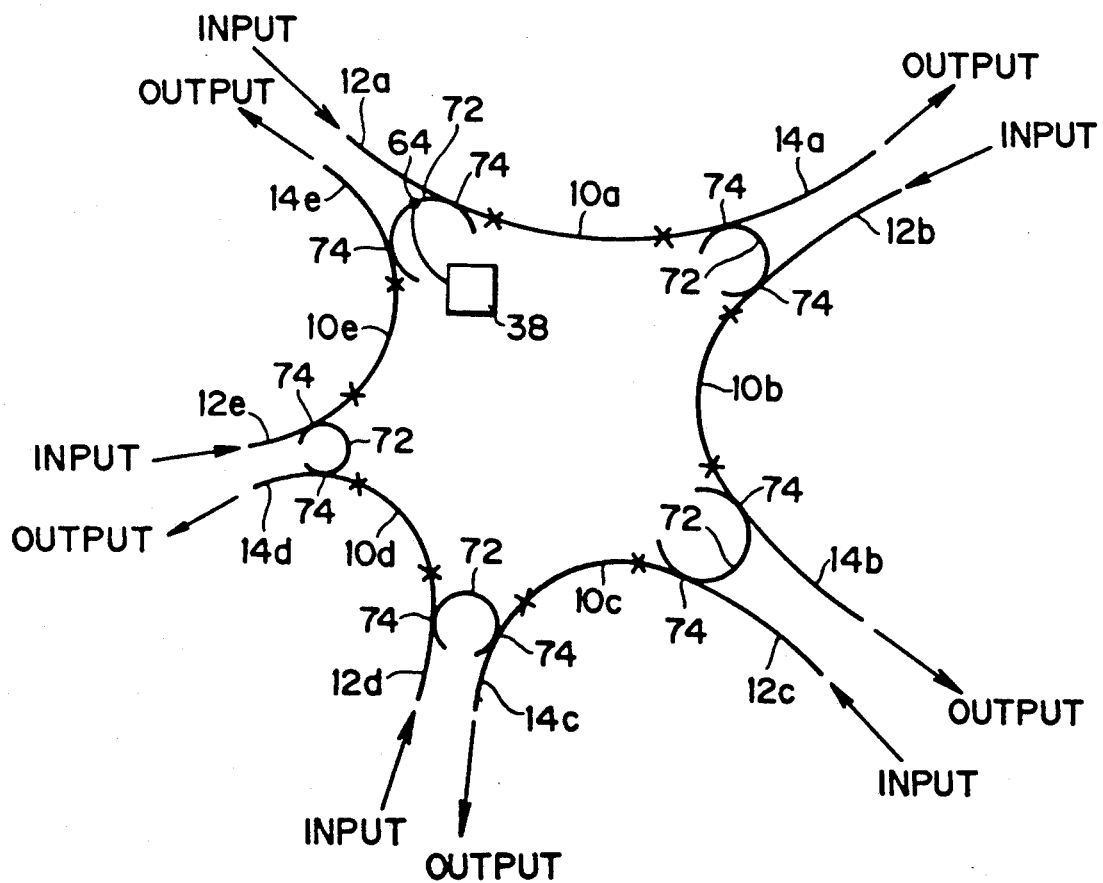
FIG. 17 is a diagrammatic view of a yet further optical fiber amplifier showing a ninth preferred embodiment of the present invention.

Referring now to FIG. 17, there is shown general construction of a yet further optical fiber amplifier according to a ninth preferred embodiment of the present invention. The optical fiber amplifier of the present embodiment includes a plurality of (five in the embodiment shown) signal light transmission lines each including the incidence side optical fiber 12, the doped fiber 10 and the emergence side optical fiber 14. The optical fibers which constitute the individual signal light transmission lines are identified with suffixes "a" to "e" to individual reference numerals. Each adjacent ones of the signal light transmission lines are connected to each other by way of a connecting fiber 72, and an optical multiplexer/demultiplexer 74 is provided at each of such connecting portions. The optical fiber amplifier wherein a plurality of optically amplifying stations are provided in the fiber loop is thus constituted with such construction as described just above. Pumping light from the pumping laser diode 38 is introduced into the fiber loop by way of the optical coupler 64 and is circulated in the fiber loop in a forward direction. Since the pumping light is gradually attenuated while it is transmitted in the fiber loop similarly as in the optical fiber amplifier of the eighth embodiment described hereinabove, the doped fibers 10a to 10e are preferably constituted such that the lengths thereof may be increased stepwise in order to make the individual amplifying stations have substantially same amplification factors.

While the optical multiplexer/demultiplexer of the fusion joined fiber type is employed in the optical fiber amplifier of any of the embodiments described above, the present invention is not limited to this. For example, an optiical multiplexer/demultiplexer which employs a dielectric multilayer film, a wavelength separating coupler or the like may be employed instead. Further, introduction of signal light into the doped fiber need not be effected by way of the incidence side optical fiber, but signal light may be introduced into the doped fiber directly from a light source such as a laser diode module.

While the optical fiber amplifiers of the embodiments shown in FIGS. 14 to 16 all adopt backward pumping wherein the incidence directions of pumping light and signal light are different from each other, similar effects can naturally be achieved even with optical fiber amplifiers which adopt forward pumping wherein the incidence direction of pumping light is reversed so that it may coincide with the incidence direction of signal light.

What is claimed is:

1. An optical fiber amplifier adapted to directly amplify signal light, comprising:
    a signal light transmission line including a rare-earth element doped fiber doped with a rare-earth element;
    a light source for emitting pumping light;
    a first optical multiplexer/demultiplexer interposed in said signal light transmission line and having an end connected to said light source, said first optical multiplexer/demultiplexer being of a fusion joined fiber type optical multiplexer/demultiplexer in which said doped fiber, an output fiber, and a fiber connected to said light source are fused and joined together; and
    pumping light reflecting means for returning pumping light which has been introduced into said doped fiber by way of said first optical multiplexer/demultiplexer and has passed through part or all of said doped fiber again into said doped fiber, said pumping light reflecting means being a reflecting film interposed in said signal light transmission line for transmitting signal light therethrough but reflecting pumping light.

2. An optical fiber amplifier adapted to directly amplify signal light, comprising:
    a signal light transmission line including a rare-earth element doped fiber doped with a rare-earth element;
    a light source for emitting pumping light;
    a first optical multiplexer/demultiplexer interposed in said signal light transmission line;
    a second optical multiplexer/demultiplexer interposed in said signal light transmission line for cooperating with said first optical multiplexer/demutiplexer to sandwich said doped fiber therebetween;
    a connecting fiber for connecting said first and second optical multiplexer/demultiplexers to each other to form a fiber loop including said doped fiber; and
    means for connecting said light source to said fiber loop.

3. An optical fiber amplifier according to claim 2, wherein each of said first and second optical multiplexer/demultiplexers is an optical multiplexer/demultiplexer of the fusion joined fiber type.

4. An optical fiber amplifier adapted to directly amplify signal light, comprising:
    a first signal light transmission line including a first rare-earth element doped fiber doped with a rare-earth element;
    a second signal light transmission line including a second rare-earth element doped fiber doped with a rare-earth element;
    a light source for emitting pumping light;

a first optical multiplexer/demultiplexer interposed in said first signal light transmission line;

a second optical multiplexer/demultiplexer interposed in said first signal light transmission line for cooperating with said first optical multiplexer/demultiplexer to sandwich said first doped fiber therebetween;

a third optical multiplexer/demultiplexer interposed in said second signal light transmission line;

a fourth optical multiplexer/demultiplexer interposed in said second signal light transmission line for cooperating with said third optical multiplexer/demultiplexer to sandwich said second doped fiber therebetween;

a first connecting fiber for connecting said second and third optical multiplexer/demultiplexers to each other;

a second connecting fiber for connecting said first and fourth optical multiplexer/demultiplexers to each other to form a fiber loop including said first and second doped fibers; and means for connecting said light source to said fiber loop.

5. An optical fiber amplifier according to claim 4, wherein each of said first to fourth optical multiplexer/demultiplexers is an optical multiplexer/demultiplexer of the fusion joined fiber type.

6. An optical fiber amplifier adapted to directly amplify signal light, comprising:

a plurality of signal transmission lines each including a rare-earth element doped fiber doped with a rare-earth element;

a plurality of connecting fibers for individually connecting adjacent ones of said signal light transmission lines to each other to form a fiber loop including the doped fibers;

a plurality of optical multiplexer/demultiplexers individually provided at connecting points between said signal light transmission lines and said connecting fibers for passing signal light therethrough but causing pumping light to circulate in said fiber loop;

a light source for emitting pumping light; and means for connecting said light source to said fiber loop.

7. An optical fiber amplifier according to claim 6, wherein each of said plurality of optical multiplexer/demultiplexers is an optical multiplexer/demultiplexer of the fusion joined fiber type.

* * * * *